United States Patent
Akhter et al.

(10) Patent No.: US 11,988,187 B1
(45) Date of Patent: May 21, 2024

(54) WIND TURBINE BLADE WITH SELF-ADAPTIVE TIP-SWEEP

(71) Applicant: UNITED ARAB EMIRATES UNIVERSITY, Al-Ain (AE)

(72) Inventors: Md. Zishan Akhter, Al-Ain (AE); Farag Khalifa Omar, Al-Ain (AE)

(73) Assignee: United Arab Emirates University, Al-Ain (AE)

( * ) Notice: Subject to any disclaimer, the term of this patent is extended or adjusted under 35 U.S.C. 154(b) by 0 days.

(21) Appl. No.: 18/352,075

(22) Filed: Jul. 13, 2023

(51) Int. Cl.
*F03D 1/06* (2006.01)

(52) U.S. Cl.
CPC ......... *F03D 1/0649* (2023.08); *F03D 1/0642* (2023.08); *F03D 1/0643* (2023.08); *F03D 1/0687* (2023.08); *F05B 2240/303* (2020.08); *F05B 2240/306* (2020.08); *F05B 2240/307* (2020.08); *F05B 2240/311* (2013.01); *F05B 2280/5001* (2013.01)

(58) Field of Classification Search
CPC .... F03D 1/0649; F03D 1/0642; F03D 1/0643; F03D 1/0687; F05B 2240/303; F05B 2240/306; F05B 2240/307; F05B 2240/311; F05B 2280/5001
See application file for complete search history.

(56) References Cited

U.S. PATENT DOCUMENTS

| | | | | | |
|---|---|---|---|---|---|
| 932,521 | A | * | 8/1909 | Wallace | F04D 29/382 416/169 R |
| 2,037,528 | A | * | 4/1936 | Miller | F03D 7/0252 416/88 |
| 2,074,149 | A | * | 3/1937 | Jacobs | B64C 11/343 416/88 |
| 4,180,372 | A | * | 12/1979 | Lippert, Jr. | F03D 7/0252 416/41 |
| 4,297,076 | A | * | 10/1981 | Donham | F03D 7/0276 416/37 |
| 4,355,955 | A | * | 10/1982 | Kisovec | F03D 7/0252 416/37 |

(Continued)

FOREIGN PATENT DOCUMENTS

| | | |
|---|---|---|
| CN | 105416568 A | 3/2016 |
| CN | 108266313 A | 7/2018 |

(Continued)

OTHER PUBLICATIONS

Boulamatsis et al., "Active control of wind turbines through varying blade tip sweep," Renewable Energy, Feb. 1, 2019, 131:25-36.

*Primary Examiner* — David E Sosnowski
*Assistant Examiner* — Ayne A Lambert
(74) *Attorney, Agent, or Firm* — Winthrop & Weinstine, P.A.; Alicia Griffin Mills; Nadeem W. Schwen

(57) ABSTRACT

A blade for a rotor of a wind turbine, the blade comprising: an inboard portion; an outboard portion connected to the inboard portion, wherein the outboard portion is deflectable by a variable sweep angle in an edgewise direction of the blade; and a passive mechanism configured to adjust the sweep angle in response to an amount of flapwise moment acting on the blade, such that the magnitude of the sweep angle increases in response to an increased flapwise moment, and decreases in response to a decreased flapwise moment.

20 Claims, 9 Drawing Sheets

(56) References Cited

U.S. PATENT DOCUMENTS

| | | | | | |
|---|---|---|---|---|---|
| 4,374,631 | A | * | 2/1983 | Barnes | F03D 7/0252 416/89 |
| 4,533,297 | A | * | 8/1985 | Bassett | F03D 1/0658 416/11 |
| 4,632,637 | A | * | 12/1986 | Traudt | F03D 7/0224 416/41 |
| 4,715,782 | A | * | 12/1987 | Shimmel | F03D 7/0252 416/169 R |
| 7,186,083 | B2 | * | 3/2007 | Bayly | H02K 7/1838 290/55 |
| 7,275,722 | B2 | * | 10/2007 | Irving | B64C 23/072 244/201 |
| 7,632,068 | B2 | * | 12/2009 | Bak | F03D 1/0641 416/132 B |
| 8,403,641 | B2 | * | 3/2013 | Gay | F03D 7/0228 416/89 |
| 8,506,248 | B2 | * | 8/2013 | Wilson | F03D 1/0675 416/41 |
| 8,602,732 | B2 | * | 12/2013 | Wilson | F03D 1/0641 416/41 |
| 10,370,098 | B1 | | 8/2019 | Beckman et al. | |
| 2006/0067828 | A1 | | 3/2006 | Wetzel | |
| 2006/0216153 | A1 | | 9/2006 | Wobben | |
| 2010/0068058 | A1 | | 3/2010 | Sørensen | |
| 2010/0135806 | A1 | * | 6/2010 | Benito | F03D 7/0228 290/55 |
| 2011/0142642 | A1 | * | 6/2011 | McGrath | F03D 7/0236 416/135 |
| 2011/0255974 | A1 | | 10/2011 | Nanukuttan et al. | |
| 2012/0027595 | A1 | * | 2/2012 | Pesetsky | F03D 1/0633 416/147 |
| 2012/0051912 | A1 | | 3/2012 | Shi | |
| 2020/0095976 | A1 | | 3/2020 | Merzhaeuser et al. | |
| 2020/0095977 | A1 | | 3/2020 | Merzhaeuser et al. | |

FOREIGN PATENT DOCUMENTS

| | | |
|---|---|---|
| CN | 110259634 A | 9/2019 |
| CN | 110307117 A | 10/2019 |
| DE | 19738278 A1 | 3/1999 |

* cited by examiner

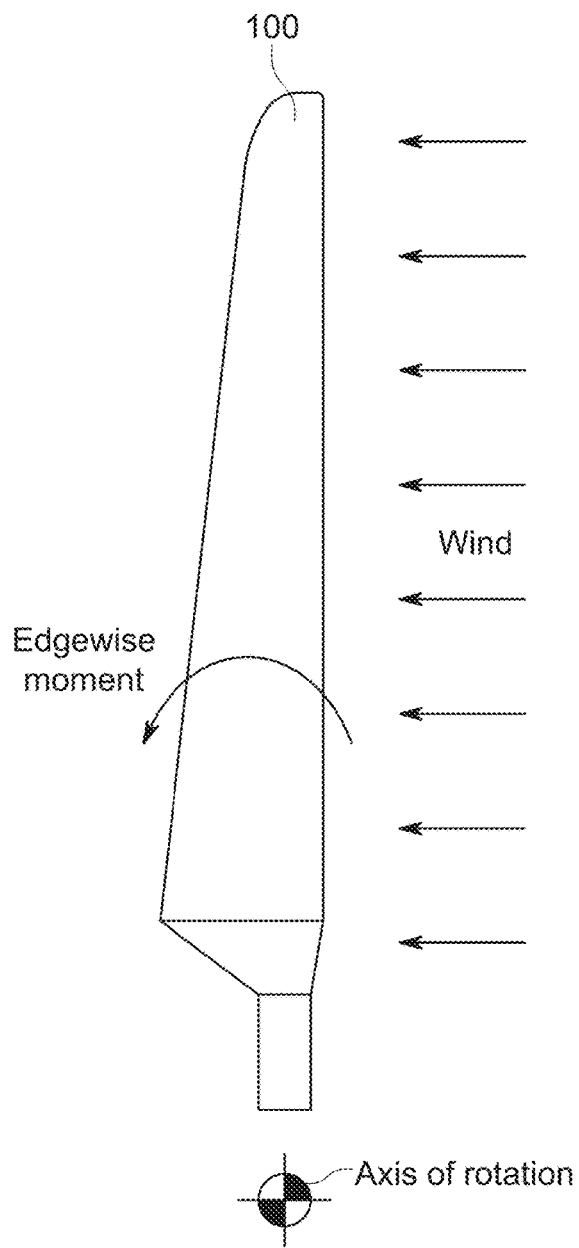
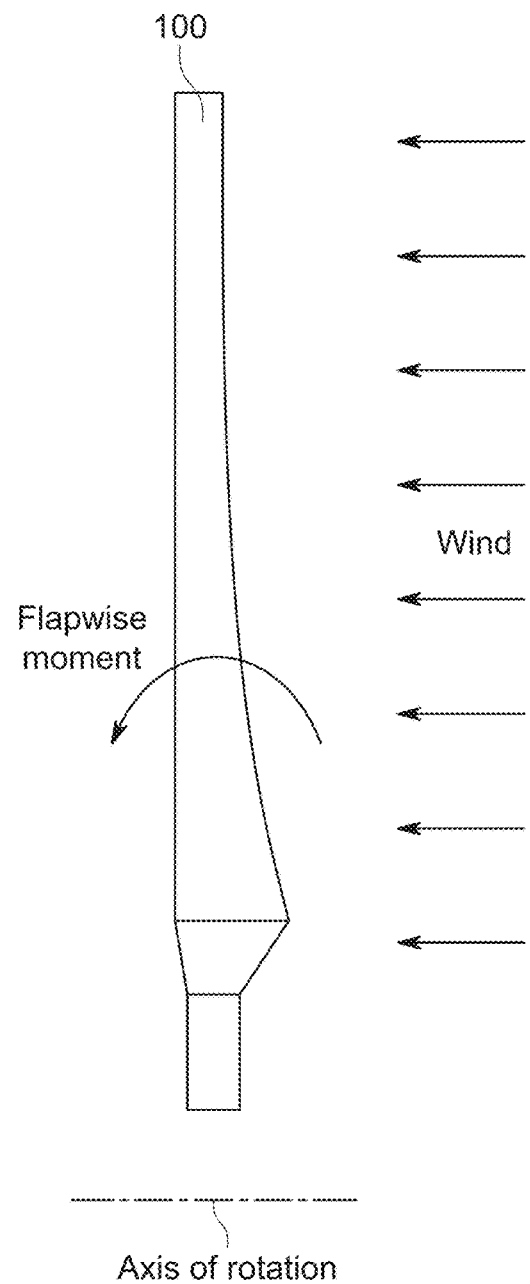
FIG. 2A
FIG. 2B

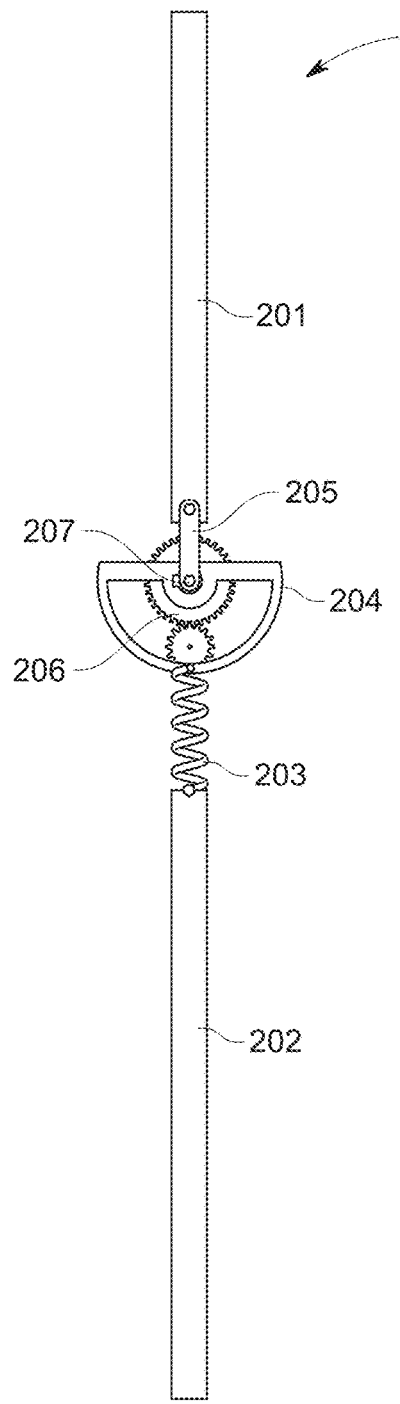
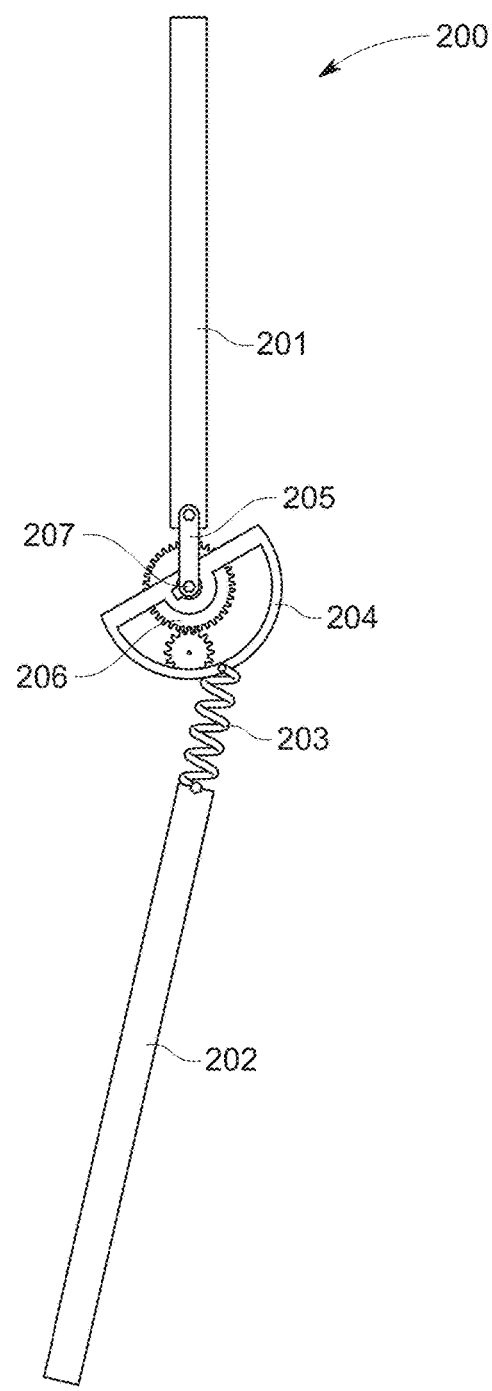
FIG. 8A
FIG. 8B

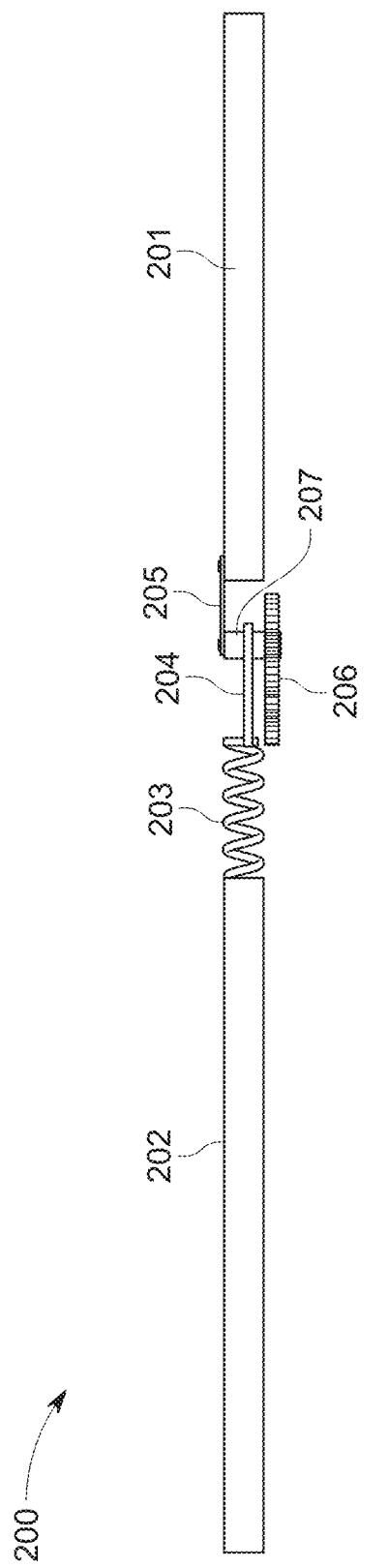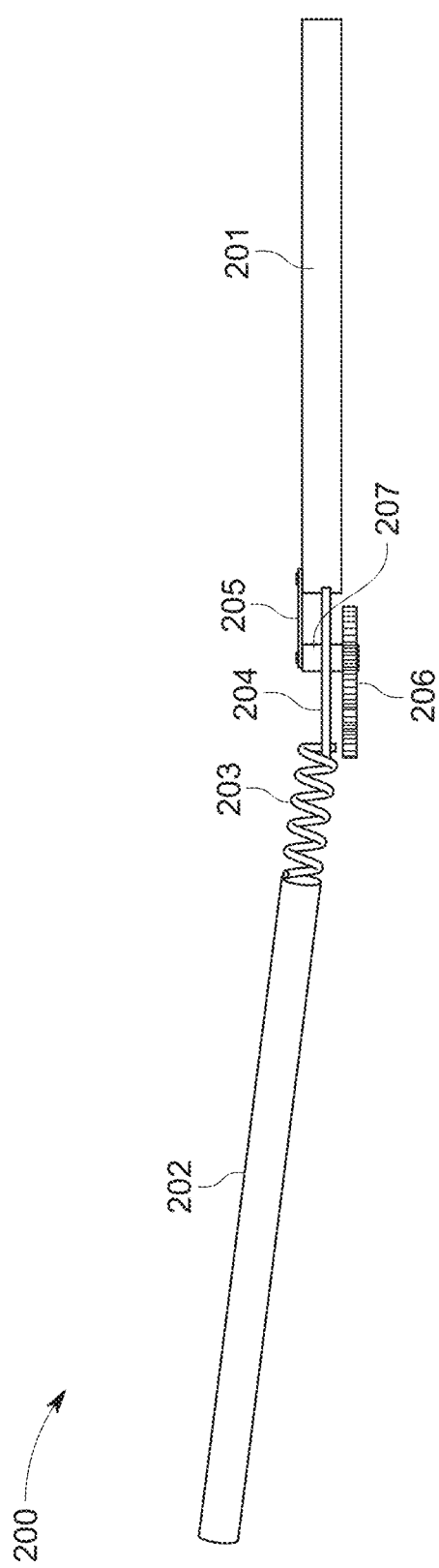

WIND TURBINE BLADE WITH SELF-ADAPTIVE TIP-SWEEP

FIELD OF THE INVENTION

The present invention is related to the technical field of wind turbines, particularly wind turbine blades.

BACKGROUND OF THE INVENTION

As the demand for clean and sustainable energy continues to rise, wind turbines have emerged as a prominent solution for harnessing the power of wind and converting it into electricity. In recent years, smaller-scale wind turbines have gained attention as a promising solution for decentralized energy generation in various settings, including residential, commercial, and rural areas. These turbines, typically ranging from a few kilowatts to a few hundred kilowatts in capacity, offer numerous advantages such as renewable energy production, reduced reliance on grid power, and potential cost savings.

Fixed-speed wind turbines, in particular, have been seen as a reliable and cost-effective solution for harnessing wind energy. These turbines operate at a constant rotational speed, typically synchronized with the grid frequency, and are known for their simplicity and durability.

In some fixed-speed wind turbines, a squirrel cage induction generator is directly connected to the electrical grid. As the wind flows over the rotor blades, the rotor spins, transferring mechanical energy to the generator, which produces electrical power. The fixed rotational speed ensures stable and consistent power output, making them suited for grid integration.

While wind turbines have been successful in generating renewable energy, they face certain limitations that hinder their overall performance and adaptability. One key limitation is the dependence on a specific wind speed range for optimal energy capture. Wind turbines usually operate most efficiently within a limited range of wind speeds, resulting in reduced power generation during low or high wind conditions. The operating ranges of fixed-speed wind turbines are particularly limited. This limitation restricts their application in areas with variable or unpredictable wind patterns.

It is therefore an object of the present invention to enable wind turbines to operate efficiently over a wider range of wind speeds.

Another object of the invention is to enable high-performance wind turbines to operate reliably and be manufactured economically.

BRIEF SUMMARY OF THE INVENTION

According to an embodiment of the present invention, there is disclosed a blade for a rotor of a wind turbine, the blade comprising: an inboard portion; an outboard portion connected to the inboard portion, wherein the outboard portion is deflectable by a variable sweep angle in an edgewise direction of the blade; and a passive mechanism configured to adjust the sweep angle in response to an amount of flapwise moment acting on the blade, such that the magnitude of the sweep angle increases in response to an increased flapwise moment, and decreases in response to a decreased flapwise moment.

The sweep angle may be a forward sweep angle.

The outboard portion may be further deflectable by a variable flapwise deflection angle. The passive mechanism may be configured to adjust the sweep angle in response to the flapwise deflection angle, such that the magnitude of the sweep angle increases in response to an increased flapwise deflection angle, and decreases in response to a decreased flapwise deflection angle.

The blade may further comprise a biasing member configured to regulate the deflection of the outboard portion.

The biasing member may be configured to bias the outboard portion towards a zero sweep angle.

The biasing member may be configured to accommodate flapwise fluctuations of the outboard portion.

The blade may further comprise a flexible blade portion intermediate the outboard portion and the inboard portion.

The flexible blade portion may be configured to maintain a smooth external surface of the blade at a plurality of sweep angles.

The flexible blade portion may be configured to dampen the deflection of the outboard portion.

The flexible blade portion may comprise a flexible cover covering the connection between the outboard portion and the inboard portion.

The flexible cover may comprise an elastomeric skin.

The blade may further comprise a damper configured to dampen the deflection of the outboard portion.

The blade may further comprise an arrester configured to limit the sweep angle to a predetermined range of angles.

The arrester may be configured to limit the magnitude of the sweep angle to a range of 0 to 60 degrees.

The arrester may be configured to limit the magnitude of the sweep angle to a range of 0 to 30 degrees.

The sweep angle may be a backward sweep angle.

The sweep angle may be adjusted by the passive mechanism in response to an amount of edgewise moment acting on the blade.

The outboard portion may have a span of about $\frac{1}{10}^{th}$ to $\frac{1}{5}^{th}$ of an overall span of the blade.

In accordance with an embodiment of the present invention, there is also disclosed a wind turbine rotor comprising a plurality of blades, wherein each blade comprises: an inboard portion; and an outboard portion connected to the inboard portion, wherein the outboard portion is deflectable by a variable sweep angle in the edgewise direction of the blade; and wherein the wind turbine rotor comprises a passive mechanism configured to adjust the sweep angle in response to an amount of flapwise moment acting on the blade, such that the magnitude of the sweep angle increases in response to an increased flapwise moment, and decreases in response to a decreased flapwise moment.

In accordance with an embodiment of the present invention, there is also disclosed a wind turbine having the wind turbine rotor.

The wind turbine may be a horizontal-axis wind turbine.

The wind turbine may be a fixed-speed wind turbine.

BRIEF DESCRIPTION OF THE DRAWINGS

The accompanying drawings, together with the detailed description below, are incorporated in and form part of the specification and serve to illustrate embodiments of concepts that include the claimed disclosure and explain various principles and advantages of those embodiments.

The process and embodiments disclosed herein have been represented where appropriate by conventional symbols in the figures showing specific details that are pertinent to understanding embodiments of the present disclosure so as not to obscure the disclosure with details that will be readily apparent to those of ordinary skill in the art having the benefit of the description herein.

FIG. 2(a) shows edgewise and flapwise moments induced in a wind turbine blade from a front view, in accordance with one embodiment.

FIG. 2(b) shows edgewise and flapwise moments induced in a wind turbine blade from a side view, in accordance with one embodiment.

FIG. 8(a) shows an exemplary passive mechanism in plan view in a non-deflected position and a deflected position, in accordance with one embodiment.

FIG. 8(b) shows an exemplary passive mechanism in plan view in a deflected position, in accordance with one embodiment.

FIG. 9(a) shows an exemplary passive mechanism in side view in a non-deflected position, in accordance with one embodiment.

FIG. 9(b) shows an exemplary passive mechanism in side view in a deflected position, in accordance with one embodiment.

DETAILED DESCRIPTION

Figure 1:
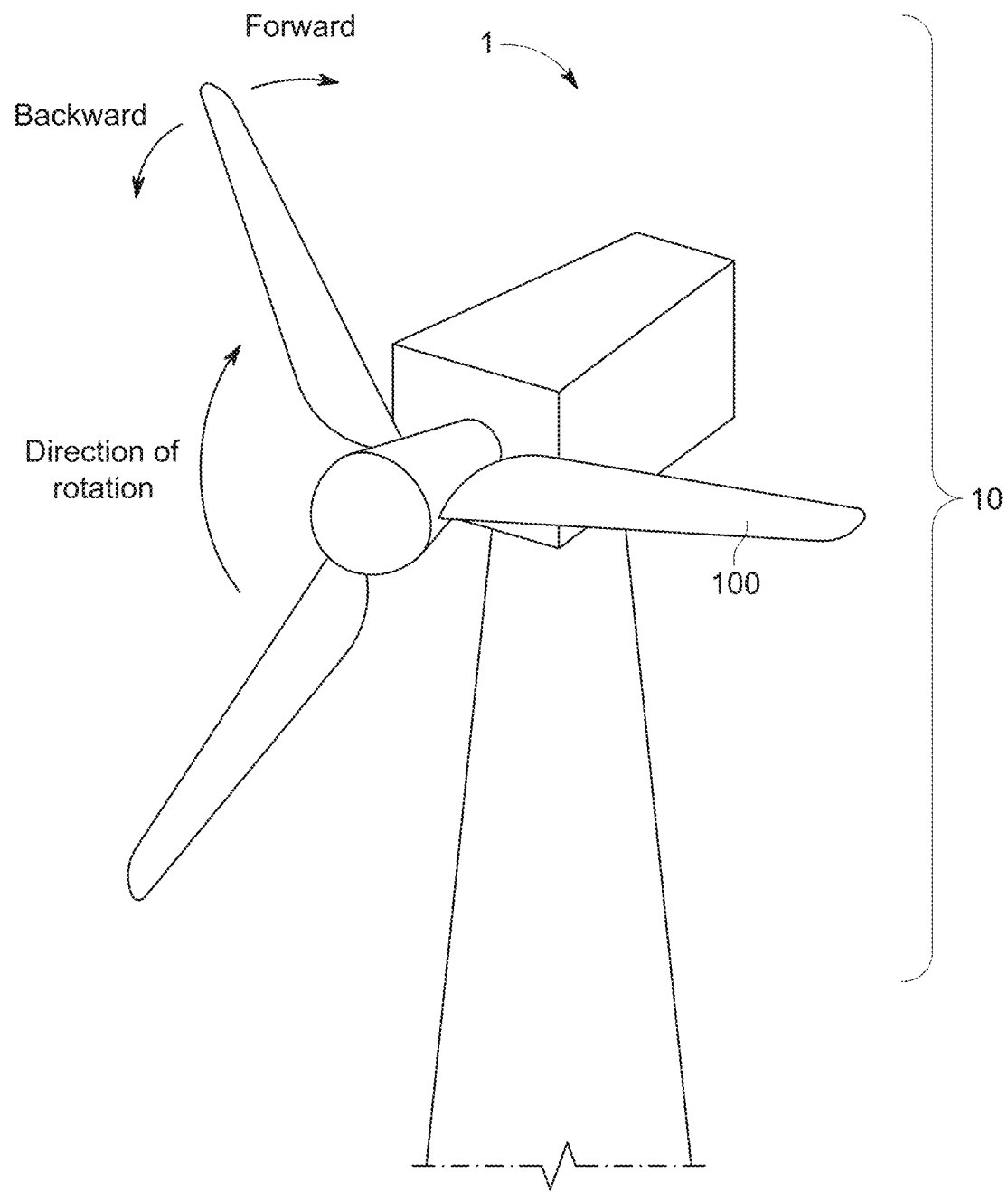
FIG. 1 shows of a wind turbine, in accordance with one embodiment.

The present disclosure is directed to a blade for a rotor of a wind turbine. An example of a horizontal-axis wind turbine is shown in FIG. 1. As shown, wind turbine 1 may comprise a wind turbine rotor 10, which in turn may comprise a plurality of blades 100. Although FIG. 1 shows a rotor 10 with three blades 100, it should be understood that the rotor 10 may comprise any number of blades 100, such as two blades, three blades, four blades, five blades, or six blades, etc.

As shown in FIG. 1, the rotor 10 may be designed to rotate in one direction of rotation. Generally, the direction of rotation of the rotor 10 may be dictated by the geometric arrangement of the blades 100. Specifically, the blade 100 may have an aerofoil profile, and may be designed to move through the air so that the leading edge cuts into the air. Therefore, the direction of rotation of the rotor 10 may be such that the leading edge of each of the blades 100 cuts into the air. For the purpose of the present disclosure, the "forward" direction is understood to be the direction in the same sense as the direction of rotation of the rotor 10. Correspondingly, the "backward" direction is understood to be the direction opposite to the direction of rotation of the rotor 10.

FIGS. 2(a) and 2(b) depict a turbine blade 100 in the frame of reference of the blade 100. In FIG. 2(a), the blade 100 is depicted from a "front view" of the rotor 10, so that the axis of rotation is perpendicular to the page. As shown, in the frame of reference of the blade 100, oncoming wind has a velocity component which points towards the leading edge from the right. Aerodynamic forces from the wind induce an edgewise moment in the blade 100. It should be understood that the wind induces a distributed edgewise load along the span of the blade 100, so that every point along the span of the blade 100 may experience some amount of edgewise moment. Generally, the edgewise moment increases from the tip of the blade 100 towards the root of the blade 100.

For the purpose of the present disclosure, the edgewise moment may be represented by a vector (n.b. the edgewise moment is represented by a round arrow on the page in FIG. 2(a), but the corresponding vector according to the "right-hand rule" points out of the page) which is parallel to the axis of rotation of the rotor 10, and is positive when the edgewise moment acts against the rotation of the rotor 10.

FIG. 2(b) shows a side view of the blade 100, so that the axis of rotation of the rotor 10 is parallel to the page. In FIG. 2(b), wind is shown to be flowing from right to left due to the velocity component of the wind, which is parallel to the axis of rotation of the rotor 10. As shown, the wind induces a flapwise moment in the blade 100. As with the edgewise moment, the wind induces a distributed flapwise load along the span of the blade 100, so that every point along the span of the blade 100 may experience some amount of flapwise moment. Generally, the flapwise moment increases from the tip of the blade 100 to the root of the blade 100. The flapwise load may increase non-linearly along the outboard regions on a horizontal-axis wind turbine blade. For the purpose of the present disclosure, the flapwise moment may be perpendicular to the edgewise moment.

Figures 3A, 3B:
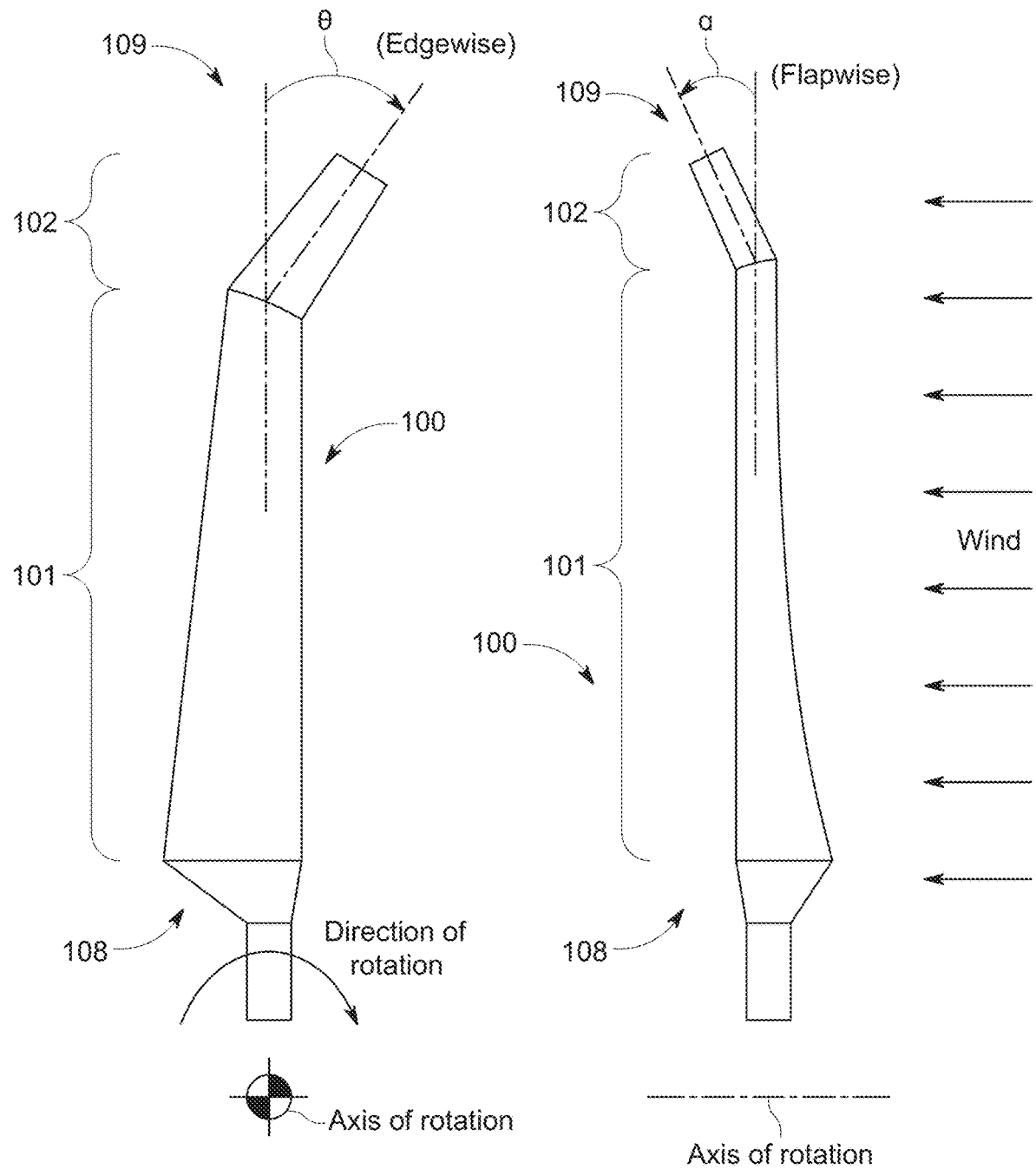
FIG. 3(a) shows a wind turbine blade with a forward-swept outboard portion, in accordance with one embodiment.
FIG. 3(b) shows a wind turbine blade with an outboard portion which is deflected in the flapwise direction, in accordance with one embodiment.

As shown in FIGS. 3(a) and 3(b), in accordance with an embodiment of the present invention, the blade 100 comprises an inboard portion 101 and an outboard portion 102. The inboard portion 101 may be located relatively closer to the axis of rotation of the rotor 10, whereas the outboard portion 102 may be located relatively further away from the axis of rotation of the rotor 10. In other words, the inboard portion 101 may be closer to the blade root 108, whereas the outboard portion 102 may be located closer to the blade tip 109.

As shown, the outboard portion 102 may be connected to the inboard portion 101. The outboard portion 102 may be deflectable by a variable sweep angle θ. The inboard portion 101 may be non-deflectable. The blade 100 may still be rotatable for adjusting the angle of attack. Alternatively, the inboard portion 101 may be rigidly fixed to the hub. As shown, the sweep angle θ is defined in the edgewise direction of the blade 100, and is defined as positive when it is in the same sense as the direction of rotation as the rotor 10. A "forward sweep" angle means that θ is positive, whereas a "backward sweep" means that θ is negative. Although FIG. 3(a) shows the outboard portion 102 with a forward sweep (θ is positive), it is understood that, in various embodiments, the variable sweep angle θ of the outboard portion 102 may be in the forward or backward direction.

A passive mechanism 200 (not shown in FIGS. 3(a) and 3(b)) may be provided to adjust the sweep angle θ in response to an amount of flapwise moment acting on the blade 100. The passive mechanism may increase the magnitude of the sweep angle |θ| with the amount of flapwise moment. The passive mechanism may increase the magnitude of the sweep angle |θ| in response to an increased flapwise moment, and may decrease the magnitude of the sweep angle |θ| in response to a decreased flapwise moment.

In other words, in high wind conditions, the flapwise moment acting on the blade 100 may increase, and the passive mechanism responds by increasing the magnitude of the sweep angle |θ|. Conversely, in low wind conditions, the flapwise moment acting on the blade 100 may decrease, and the passive mechanism responds by decreasing the magnitude of the sweep angle |θ|. Generally, for fixed-speed wind turbines, the flapwise load/moment increases with the wind speed.

For the purpose of the present disclosure, a "passive mechanism" may be one which does not require an external power source to function, such as electrical power or pneumatic/hydraulic actuation. For example, a passive mechanism may be purely mechanical. An advantage of a passive mechanism is that the blade 100 may have a simple design and may be simple to manufacture. For example, sensors, cabling and actuators may not be required.

Regarding the definition of the sweep angle θ, it may be understood that θ=0 when the outboard portion 102 is in its neutral position. That is, at θ=0, the outboard portion 102 may assume the position of the outboard portion 102 when the blade 100 is not subjected to any mechanical load. For example, a sweep angle of θ=0 may correspond to the position of the outboard portion 102 when the rotor 10 is stationary and when windspeed is zero.

Figure 4:
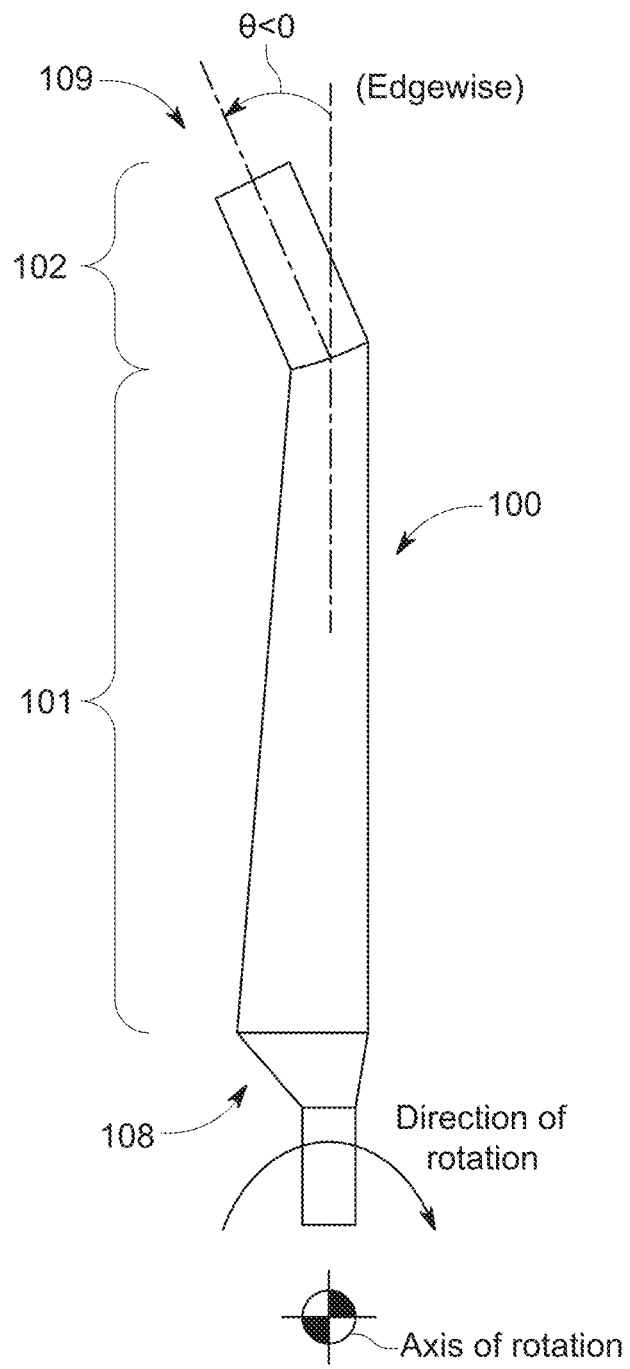
FIG. 4 shows a wind turbine blade with a backward-swept outboard portion, in accordance with one embodiment.

As noted above, the variable sweep angle of the outboard portion 102 may be a forward sweep angle as shown in FIG. 3(*a*). Alternatively, as shown in FIG. 4, which will be discussed in further detail below, the variable sweep angle θ of the outboard portion 102 may be a backward sweep angle.

By introducing a deflectable outboard portion 102 which deflects to a certain (whether backward or forward) sweep angle, the blade 100 may be capable of generating a greater amount of torque in high wind conditions than a blade without a deflectable outboard portion.

The performance of the sweeping mechanism was analysed on a modified two-bladed National Renewable Energy Laboratory (NREL) Phase-VI research wind turbine. The wind turbine features are tabulated in Table 1. In the analysis, the outboard portion 102 has a span which is $\frac{1}{10}^{th}$ of the overall span of the blade 100.

TABLE 1

| NREL Phase-VI wind turbine | |
|---|---|
| Number of blades | 2 |
| Wind turbine diameter (D) | 10.06 m |
| Blade chord (C) | (0.358-0.737) m |
| Hub height (H) | 12.2 m |
| RPM | 72 |
| Cut-in wind speed | 5 m/s |
| Rated wind speed | 13.5 m/s |
| Cut-out wind speed | 25 m/s |
| Rated power | 19.8 kW |

Two forward sweep angles θ were investigated, namely θ=30° and θ=60°. For the purpose of the analysis, the sweep angle θ is fixed (i.e. non-variable) in both cases. The unmodified NREL blade (with no swept outboard portion) is used as a comparative example.

Figure 10:
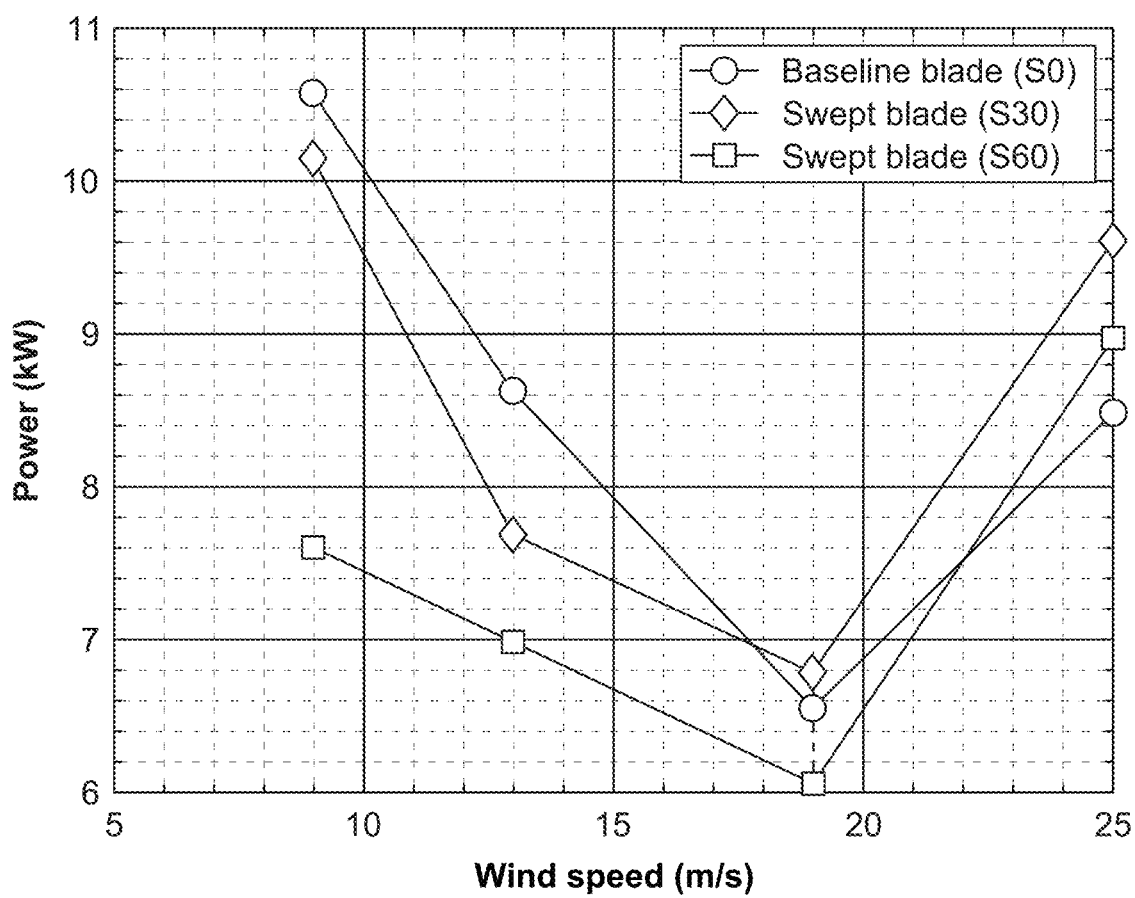
FIG. 10 shows the effect of the sweep angle of the outboard portion on power output of a simulated turbine at various wind speeds.

A comparative power chart is presented in FIG. 10. As shown, with a sweep angle of θ=30° (data series "S30"), a power increment of 3.5% and 13.3% compared with the non-swept blade (data series "S0") is observed at the wind speeds of 19 m/s and 25 m/s, respectively. With a sweep angle of θ=60°, a power increment of 5.7% compared with the non-swept blade is observed at a wind speed of 25 m/s.

The increased power output results from a lift-augmentation due to the increment in effective chord length along the streamline direction when the outboard portion 102 is swept, which in turn increases the overall blade wetted area, so that there is an enlarged surface area on which the wind can act. As the pressure surface and the suction surface are, in effect, enlarged, the pressure difference between the suction and pressure surfaces generates a greater lift force. This boosts the aerodynamic torque and, consequently, the power output at the generator. Additionally, forward sweep of the outboard portion 102 reduces tip-vorticity, which further improves blade aerodynamics and reduces noise levels.

As can be seen from FIG. 10, the benefit of tip-sweep is particularly achieved at high wind speeds and/or rpm. In this particular analysis, the power performance is seen to deteriorate at lower wind speeds. For θ=30°, the power output drops below the control blade at around 18 m/s or less. For θ=60°, the power output drops below the control blade at around 22 m/s or less.

In some situations, such as, at low wind speeds, it may be less desirable for the outboard portion 102 to be swept. Instead, at lower wind speeds, the outboard portion 102 may have a small amount of, or zero, sweep, and the outboard portion 102 may have a larger sweep at high windspeeds. Therefore, by decreasing the magnitude of the sweep angle |θ| at low windspeeds and increasing the magnitude of the sweep angle |θ| at high windspeeds, the wind turbine blade 100 may be capable of generating more torque in a wider range of windspeeds than a blade without a deflectable outboard portion. More particularly, the passive mechanism may be configured so that the outboard portion 102 remains non-swept up to a predetermined threshold of windspeed (or up to a predetermined threshold of flapwise moment, which generally correlates with windspeed).

Different mechanism may be used to enable the passive mechanism to respond to the amount of flapwise moment acting on the blade 100. For example, as shown in FIG. 3(*b*), the outboard portion 102 may be deflectable by a variable flapwise deflection angle α, in addition to being deflectable by a variable sweep angle θ in the edgewise direction. The flapwise deflection of the outboard portion 102 may be induced by the wind acting on the blade 100. Therefore, as shown, the flapwise deflection angle α is defined in the same direction as the flapwise moment induced by the wind. In other words, the flapwise deflection angle α may serve as an indication of the amount of flapwise moment acting on the blade 100.

In certain embodiments, the passive mechanism may use the flapwise deflection angle α of the outboard portion 102 as a measurement of the flapwise moment acting on the blade 100. Therefore, the mechanism may be configured to increase the magnitude of the sweep angle |θ| in response to an increased flapwise deflection angle α, and may decrease the magnitude of the sweep angle |θ| in response to a decreased flapwise deflection angle α.

FIG. 5-9(*b*) illustrate further details about an example passive mechanism 200.

As shown, the passive mechanism 200 may comprise a biasing member 203 configured to regulate the deflection of the outboard portion 102. The biasing member 203 may regulate the deflection of the outboard portion 102 in the edgewise and/or flapwise directions. For example, the biasing member 203 may bias the outboard portion 102 towards a zero-sweep angle (θ=0). As noted above, the sweep angle may be defined to be at zero when the blade 100 is stationary and not subjected to any aerodynamic load. In other words, the biasing member 203 may provide a restoring force which biases the outboard portion 102 towards a neutral position. When windspeed increases, the flapwise moment acting on the blade 100 may increase, which may in turn act against the restoring force of the biasing member 203.

An equilibrium flapwise deflection angle α may exist where the restoring force of the biasing member 203 and the flapwise moment acting on the blade (e.g. at the connection between the inboard portion 101 and the outboard 102) substantially balance out. Nevertheless, because the outboard portion 102 has a certain mass, changes in the flapwise moment acting on the blade 100 may not necessarily translate instantaneously to the corresponding equilibrium flapwise deflection angle α. Instead, there may be a time lag between changes in the flapwise moment and changes in the flapwise deflection angle α of the outboard portion 102. Therefore, the biasing member 203 may be capable of accommodating flapwise fluctuations of the outboard portion 102. Specifically, because of the time lag, the biasing member 203 may smooth out flapwise fluctuations of the outboard portion 102, so that the outboard portion 102 is maintained at a relatively stable flapwise deflection angle α. Therefore, by virtue of the biasing member 203, the blade 100 may be capable of operating in unsteady wind conditions.

The properties of the biasing member 203 may be chosen accordingly. For example, the biasing member 203 may have a spring constant which is chosen to prevent the outboard portion 102 from oscillating harmonically at a resonant frequency of the blade 100 as a whole, or of the rotor 10 as a whole, or of the entire wind turbine 1 as a whole.

Figure 5:
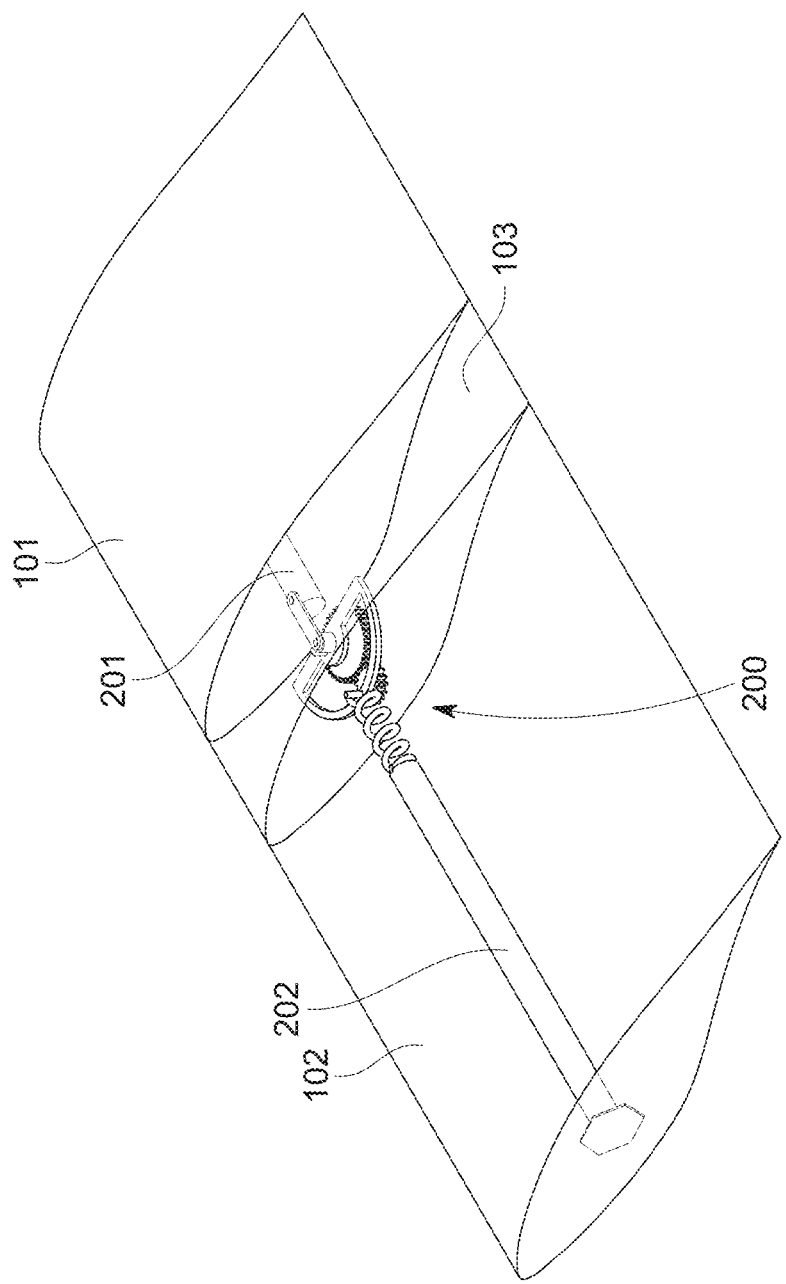
FIG. 5 shows an overview of a section of a wind turbine blade with an exemplary passive mechanism, in accordance with one embodiment.
Figure 6:
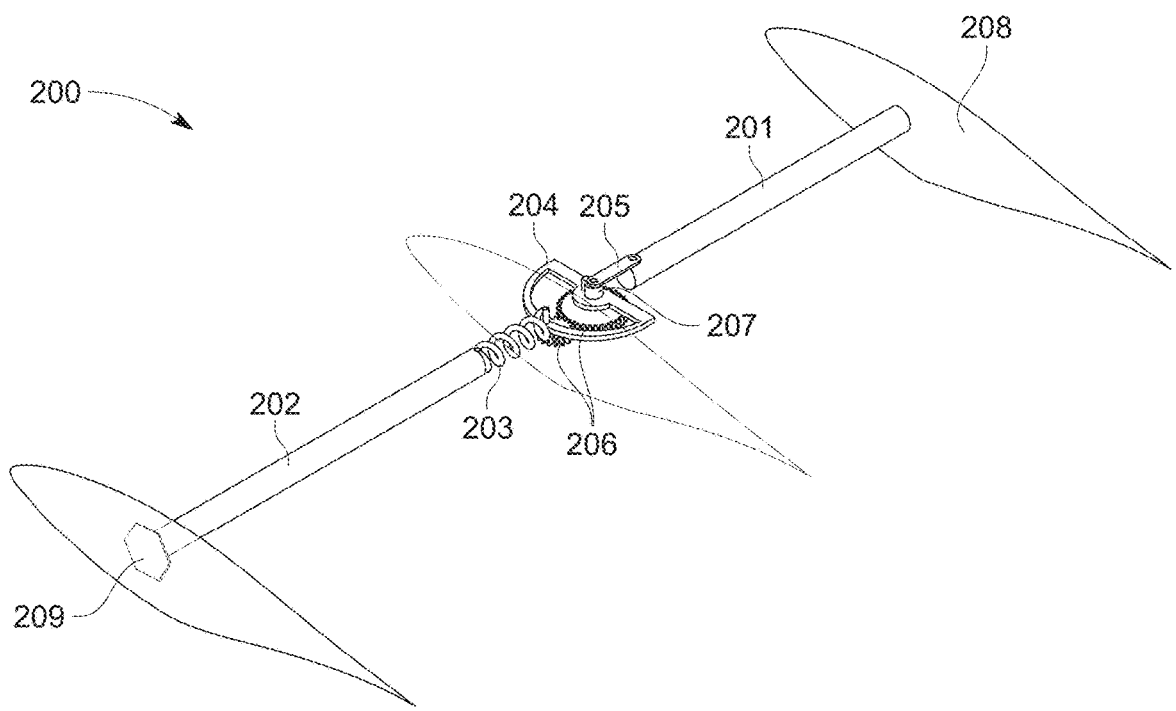
FIG. 6 shows an overview of the exemplary passive mechanism.

As shown in FIG. 5, the blade 100 may further comprise a flexible blade portion 103 intermediate the outboard portion 102 and the inboard portion 101. The flexible blade portion 103 may maintain a smooth external surface of the blade 100. In particular, the flexible blade portion 103 may maintain a smooth external surface of the blade 100 at a plurality of sweep angles θ. In other words, as the outboard portion 102 deflects to different sweep angles θ, the flexible blade portion 103 may continue to provide an aerodynamic profile. For example, the flexible blade portion 103 may remain wrinkle-free at a plurality of sweep angles θ.

The flexible blade portion 103 may dampen the deflection of the outboard portion 102. That is, the flexible blade portion 103 may be capable of attenuating oscillations of the outboard portion 102. The flexible blade portion 103 may be capable of dampening the deflection of the outboard portion 102 in the edgewise direction and/or the flapwise direction.

The flexible blade portion 103 may be combined with the biasing member 203 mentioned above. The flexible blade portion 103, together with the biasing member 203 and the mass of the outboard portion 102, may be analysed as a mass-spring-damper system. Therefore, the flexible blade portion 103 and/or the biasing member 203 may be tuned to provide effective attenuation of harmful oscillations of the outboard portion 102.

In an embodiment, the flexible blade portion 103 comprises a flexible cover covering the connection between the outboard portion 102 and the inboard portion 101. The flexible cover may conceal and protect the passive mechanism from rain, dust, etc.

The flexible blade portion 103 may comprise an elastomeric material. For example, the flexible cover may comprise an elastomeric skin. Any suitable elastomer may be used. In particular, the elastomer may be chosen to provide effective attenuation of oscillations of the outboard portion 102. For example, the elastomer may have a high damping factor.

In addition to, or as an alternative to, the flexible blade portion 103, the blade 100 may comprise a damper (not shown) configured to dampen the deflection of the outboard portion 102. The damper may be configured to dampen the deflection of the outboard portion 102 in the edgewise direction and/or the flapwise direction. As before, the damper may be employed in conjunction with the biasing member 203. The damper and the biasing member 203 may be tuned to attenuate oscillations of the outboard portion 102 at harmful frequencies.

The blade 100 may comprise an arrester configured to limit the sweep angle θ to a predetermined range of angles. For example, the arrester may be configured to limit the magnitude of the sweep angle |θ| to a range of 0 to 60°, 0 to 50°, 0 to 40°, 0 to 30°, 0 to 20°, or 0 to 10°, for example. Specifically, if a forward sweep angle θ is desired, the arrester may be configured to limit the sweep angle θ to a range of 0 to +60°, 0 to +50°, 0 to +40°, 0 to +30°, 0 to +20°, or 0 to +10°, for example. Conversely, if a backward sweep is desired, the arrester may be configured to limit the sweep angle θ to a range of 0 to −60°, 0 to −50°, 0 to −40°, 0 to −30°, 0 to −20°, or 0 to −10°, for example.

As shown in the example of FIG. 10, a larger sweep angle θ does not necessarily translate to a higher power output. Therefore, the arrester may be configured to limit the magnitude of the sweep angle |θ| so as to achieve an improvement in the power output of the blade 100 compared with a non-swept blade.

As noted above, the sweep angle θ of the outboard portion 102 need not be in the forward direction, and may instead be in the backward direction. FIG. 4 shows the blade 100 with the outboard portion 102 swept in the backward direction. In this embodiment, the aerodynamic forces generated by the wind may act in favour of a backward sweep angle θ of the outboard portion 102. In other words, the edgewise moment generated by the wind may be in the same direction as the (backward) sweep angle θ of the outboard portion 102. Therefore, in this embodiment, the sweep angle θ of the outboard portion 102 may be adjusted by the passive mechanism 200 in response to the amount of edgewise moment acting on the blade 100. More specifically, the passive mechanism 200 may adjust the sweep angle θ of the outboard portion 102 in response to the edgewise moment and the flapwise moment combined.

The span of the outboard portion 102 may be variously determined. For example, the span of the outboard portion 102 may be about $1/10^{th}$, $1/9^{th}$, $1/8^{th}$, $1/7^{th}$, $1/6^{th}$, $1/5^{th}$, or other of the overall span of the blade 100.

An exemplary implementation of the passive mechanism 200 is described below with reference to FIGS. 5-9(b).

As shown, the passive mechanism 200 may comprise:

a) Primary shaft 201: The primary shaft 201 extends towards the inboard portion 101 of the blade 100, and serves as the load-bearing skeletal member.

b) Secondary shaft 202: The secondary shaft 202 is housed within the outboard portion 102, and provides structural support to the outboard portion 102. When the outboard portion 102 is not swept, the secondary shaft 202 may be co-axially aligned with the primary shaft 201 as shown in FIG. 8(a).

c) Base plate 209: The base plate 209 provides a point of fixation for the secondary shaft 202, and may fix the position of the secondary shaft 202 within the outboard portion 102.

d) Biasing member 203: The biasing member 203 is connected to the secondary shaft 202 and may regulate the edgewise deflection of the outboard portion 102. It may further act as damper against flapwise load fluctuations in the outboard portion 102.

e) Cam 204: As the outboard portion 102 and the secondary shaft 202 deflect in the flapwise direction, the biasing member 203 is caused to shorten (see FIG. 9(b)), which creates a compressive load in the biasing member 203. The cam 204 converts the compressive load in the biasing member 203 into rotary motion of the cam 204, as shown in FIG. 8(b). The cam 204 may further act as a connection between the shafts through brace 205.

f) Hub 207: The hub 207 transfers the rotary motion of the cam 204 to the spur gears 206.

g) Brace 205: The brace 205 acts as a connection between the shafts 201, 202 while providing positioning and structural support to the passive mechanism 200.

h) Spur gears 206 (pair): The pair of spur gears 206 reverse and transfer the rotary motion of the cam 204 to the outboard portion 102, so as to cause the forward sweep of the outboard portion 102.

i) Arrester (not shown): Stops/limiters may be placed in the periphery of the cam to guide and constrain its rotary motion to achieve the desired deflection of the outboard portion 102. An arrester may be placed to prevent a backward sweep of the outboard portion 102. Another arrester may be placed to limit the maximum forward sweep of the outboard portion 102.

j) Elastomeric skin (not shown): As described above, the flexible blade cover 103 may comprise an elastomeric skin which envelopes the passive mechanism 200 and may serve as an interface for the inboard portion 101 and the outboard portion 102. It may provide a smooth and wrinkle-free external surface to the blade 100.

Figure 7:
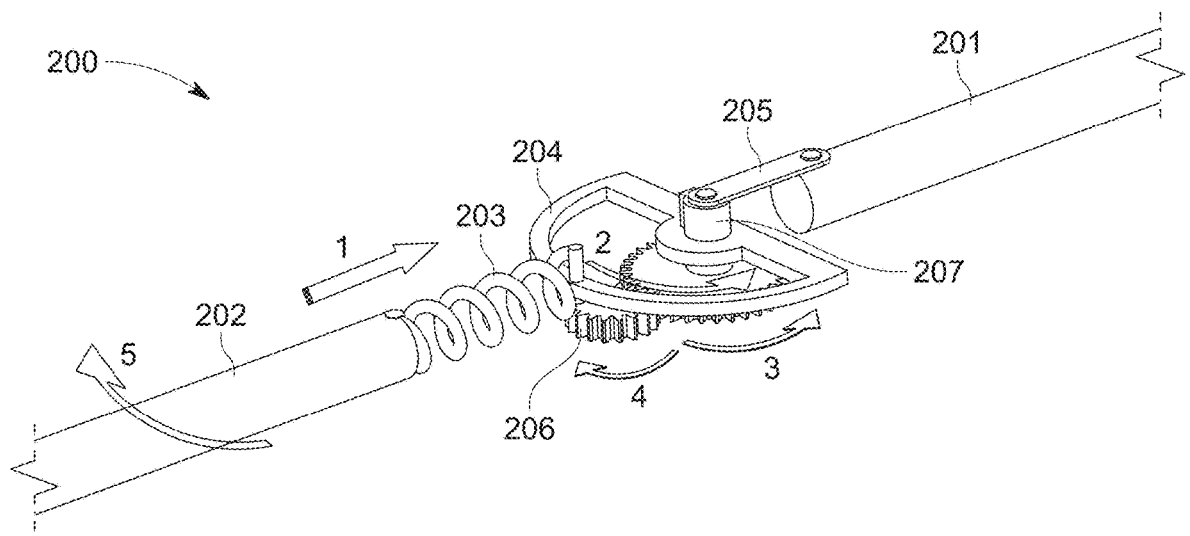
FIG. 7 shows the exemplary passive mechanism in more detail.

In an exemplary mode of operation of the passive mechanism 200, as wind speed increases, the flapwise moment acting on the blade 100 also increases. As shown in FIG. 7, the flapwise moment generates a compressive load [arrow 1] radially inwards, towards the blade root due to gradual spanwise reduction in the flapwise load. The compressive load [arrow 1] deforms the biasing member 203, which provides a restoring force biasing the outboard portion 102 towards a neutral position (i.e. towards the trailing edge of the blade 100). The compressive force in the biasing member 203 causes the cam 204 to rotate [arrow 2] (e.g. in the counter-clockwise direction, as shown in FIG. 8). A driver gear is fixed to the cam 204 and rotates [arrow 3] with the cam 204 via the hub 207. The driver gear engages the driven gear, which causes the driven gear to rotate [arrow 4] in the opposite direction. The driven gear is rigidly fixed to the outboard portion 102, and the rotation of the driven gear causes the outboard portion 102 to be swept [arrow 5] in the forward direction. Thus, the passive mechanism 200 deflects the outboard portion 102 to achieve the desired sweep.

The exemplary passive mechanism 200 shown in FIGS. 6 to 9 is configured to achieve forward sweep of the outboard portion 102. In order to achieve a backward sweep angle θ of the outboard portion 102, the exemplary passive mechanism 200 shown in FIGS. 6 to 9 may be mirrored. For example, backward sweep deflection may be achieved using the flapwise moment by mirroring the attachment of the biased member 203 to the cam 204, across the blade longitudinal axis. Thus, the flapwise deflection of the outboard portion 102 may rotate the cam 204 and gears 206 in the opposite direction, thereby producing backward sweep.

Whereas a forward sweep of the outboard portion 102 may be desired at higher wind speeds, the biasing member 203 attached to the secondary shaft 202 may act as an absorber for the compressive loads generated by flapwise loads/moments at lower wind speeds. The spring constant of the biasing member 203 along with radius of the cam 204, and gear ratio of the spur gears 206 can be collectively selected to characterise the passive mechanism 200 based on the blade aerodynamics.

The passive mechanism 200 can be integrated on any scale of horizontal-axis wind turbine, and can be adapted for any desired size of wind turbine, position, and sweep angle(s), by analysing the blade aerodynamics and target operational conditions.

In addition to blade 100, the present disclosure also provides a wind turbine rotor 10 comprising a plurality of the blades 100 and the passive mechanism 200 described above. Each blade 100 may be implemented as described above. Each blade 100 may be equipped with its own passive mechanism 200.

The present disclosure also contemplates a wind turbine 1 having the above wind turbine rotor 10. The wind turbine 1 may be a horizontal-axis wind turbine. Furthermore, the wind turbine 1 may be a fixed-speed wind turbine. As noted above, the present invention may be particularly advantageous for fixed-speed wind turbines because wind turbines of this type typically have a relatively narrow range of operating wind speeds. Therefore, with the present invention, the range of operating wind speeds may be extended. In particular, the present invention may enable a fixed-speed wind turbine to generate more power output at high windspeeds while maintaining its power output at low windspeeds.

The clauses below define combinations of features, in accordance with various embodiments. The applicant reserves the right to pursue protection for the combinations of features set out in these clauses, and/or for any other subject-matter contained in the application as filed, either in the present application or in a further application divided from the present application. These clauses are not claims of the present application.

Clause 1. A blade (100) for a rotor (10) of a wind turbine (1), the blade comprising:
  an inboard portion (101);
  an outboard portion (102) connected to the inboard portion, wherein the outboard portion is deflectable by a variable sweep angle (θ) in an edgewise direction of the blade; and
  a passive mechanism (200) configured to adjust the sweep angle in response to an amount of flapwise moment acting on the blade, such that the magnitude of the sweep angle (|θ|) increases in response to an increased flapwise moment, and decreases in response to a decreased flapwise moment.

Clause 2. The blade of clause 1, wherein the sweep angle is a forward sweep angle.

Clause 3. The blade of clause 1 or clause 2, wherein:
  the outboard portion is further deflectable by a variable flapwise deflection angle (α); and
  the passive mechanism is configured to adjust the sweep angle in response to the flapwise deflection angle, such that the magnitude of the sweep angle increases in response to an increased flapwise deflection angle, and decreases in response to a decreased flapwise deflection angle.

Clause 4. The blade of any one of the preceding clauses, further comprising a biasing member (203) configured to regulate the deflection of the outboard portion.

Clause 5. The blade of clause 4, wherein the biasing member is configured to bias the outboard portion towards a zero sweep angle.

Clause 6. The blade of clause 4 or clause 5, wherein the biasing member is configured to accommodate flapwise fluctuations of the outboard portion.

Clause 7. The blade of any one of the preceding clauses, further comprising a flexible blade portion (103) intermediate the outboard portion and the inboard portion.

Clause 8. The blade of clause 7, wherein the flexible blade portion is configured to maintain a smooth external surface of the blade at a plurality of sweep angles.

Clause 9. The blade of clause 7 or clause 8, wherein the flexible blade portion is configured to dampen the deflection of the outboard portion.

Clause 10. The blade of any one of clauses 7 to 9, wherein the flexible blade portion comprises a flexible cover covering the connection between the outboard portion and the inboard portion.

Clause 11. The blade of clause 10, wherein the flexible cover comprises an elastomeric skin.

Clause 12. The blade of any one of the preceding clauses, further comprising a damper configured to dampen the deflection of the outboard portion.

Clause 13. The blade of any one of the preceding clauses, further comprising an arrester configured to limit the sweep angle to a predetermined range of angles.

Clause 14. The blade of clause 13, wherein the arrester is configured to limit the magnitude of the sweep angle to a range of 0 to 60 degrees.

Clause 15. The blade of clause 13, wherein the arrester is configured to limit the magnitude of the sweep angle to a range of 0 to 30 degrees.

Clause 16. The blade of any one of clauses 1 and 3 to 15, wherein the sweep angle is a backward sweep angle.

Clause 17. The blade of clause 16, wherein the sweep angle is adjusted by the passive mechanism in response to an amount of edgewise moment acting on the blade.

Clause 18. The blade of any one of the preceding clauses, wherein the outboard portion has a span of about 1110th to 115th of an overall span of the blade.

Clause 19. A wind turbine rotor (10) comprising a plurality of blades, wherein each blade comprises:
an inboard portion (101); and
an outboard portion (102) connected to the inboard portion, wherein the outboard portion is deflectable by a variable sweep angle ($\theta$) in the edgewise direction of the blade; and
wherein the wind turbine rotor comprises a passive mechanism (200) configured to adjust the sweep angle in response to an amount of flapwise moment acting on the blade, such that the magnitude of the sweep angle ($|\theta|$) increases in response to an increased flapwise moment, and decreases in response to a decreased flapwise moment.

Clause 20. A wind turbine (1) having the wind turbine rotor of clause 19.

Clause 21. The wind turbine of clause 20, being a horizontal-axis wind turbine.

Clause 22. The wind turbine of clause 20 or clause 21, bring a fixed-speed wind turbine.

What is claimed is:

1. A blade for a rotor of a wind turbine (1), the blade comprising:
an inboard portion;
an outboard portion connected to the inboard portion, wherein the outboard portion is deflectable by a variable sweep angle ($\theta$) in an edgewise direction of the blade; and
a passive mechanism configured to adjust the sweep angle in response to an amount of flapwise moment acting on the blade, such that the magnitude of the sweep angle ($|\theta|$) increases in response to an increased flapwise moment, and decreases in response to a decreased flapwise moment.

2. The blade of claim 1, wherein the sweep angle is a forward sweep angle.

3. The blade of claim 1, wherein:
the outboard portion is further deflectable by a variable flapwise deflection angle ($\alpha$); and
the passive mechanism is configured to adjust the sweep angle in response to the flapwise deflection angle, such that the magnitude of the sweep angle increases in response to an increased flapwise deflection angle, and decreases in response to a decreased flapwise deflection angle.

4. The blade of claim 1, further comprising a biasing member configured to regulate the deflection of the outboard portion.

5. The blade of claim 4, wherein the biasing member is configured to bias the outboard portion towards a zero sweep angle.

6. The blade of claim 4, wherein the biasing member is configured to accommodate flapwise fluctuations of the outboard portion.

7. The blade of claim 1, further comprising a flexible blade portion intermediate the outboard portion and the inboard portion.

8. The blade of claim 7, wherein the flexible blade portion is configured to maintain a smooth external surface of the blade at a plurality of variable sweep angles.

9. The blade of claim 7, wherein the flexible blade portion is configured to dampen the deflection of the outboard portion.

10. The blade of claim 7, wherein the flexible blade portion comprises a flexible cover covering the connection between the outboard portion and the inboard portion.

11. The blade of claim 10, wherein the flexible cover comprises an elastomeric skin.

12. The blade of claim 1, further comprising a damper configured to dampen the deflection of the outboard portion.

13. The blade of claim 1, further comprising an arrester configured to limit the sweep angle to a predetermined range of angles.

14. The blade of claim 1, wherein the sweep angle is a backward sweep angle.

15. The blade of claim 14, wherein the sweep angle is adjusted by the passive mechanism in response to an amount of edgewise moment acting on the blade.

16. The blade of claim 1, wherein the outboard portion has a span of about $1/10^{th}$ to $1/5^{th}$ of an overall span of the blade.

17. A wind turbine rotor comprising a plurality of blades, wherein each blade comprises:
an inboard portion; and
an outboard portion connected to the inboard portion, wherein the outboard portion is deflectable by a variable sweep angle ($\theta$) in the edgewise direction of the blade; and
wherein the wind turbine rotor comprises a passive mechanism configured to adjust the sweep angle in response to an amount of flapwise moment acting on the blade, such that the magnitude of the sweep angle ($|\theta|$) increases in response to an increased flapwise moment, and decreases in response to a decreased flapwise moment.

18. A wind turbine having the wind turbine rotor of claim 17.

19. The wind turbine of claim 18, being a horizontal-axis wind turbine.

20. The wind turbine of claim 19, bring a fixed-speed wind turbine.

* * * * *